United States Patent
Kölling

Patent Number: 5,726,358
Date of Patent: Mar. 10, 1998

[54] METHOD AND DEVICE FOR MEASURING THE DISCHARGE IN PARTLY FILLED OR COMPLETELY FILLED DUCTS AND IN OPEN CHANNELS

[76] Inventor: Christian Kölling, Karwendelstrasse 4, D-82538 Geretsried-Gelting, Germany

[21] Appl. No.: 492,103
[22] PCT Filed: Jan. 25, 1994
[86] PCT No.: PCT/EP94/00193
§ 371 Date: Jul. 23, 1995
§ 102(e) Date: Jul. 23, 1995
[87] PCT Pub. No.: WO94/17368
PCT Pub. Date: Aug. 4, 1994

[30] Foreign Application Priority Data

Jan. 25, 1993 [DE] Germany .......... 43 01 905.6
Jun. 18, 1993 [DE] Germany .......... 43 20 295.0

[51] Int. Cl.⁶ ............................................. G01F 1/20
[52] U.S. Cl. ........................................ 73/215; 364/509
[58] Field of Search ................... 73/215, 152.05; 364/509, 510, 578

[56] References Cited

U.S. PATENT DOCUMENTS

| | | | |
|---|---|---|---|
| 4,202,211 | 5/1980 | Perry | 73/227 |
| 4,534,003 | 8/1985 | Manzione | 364/476 |
| 4,663,977 | 5/1987 | Vander Heyden | 73/861.27 |
| 4,989,166 | 1/1991 | Akasaka et al. | 364/578 |
| 5,186,150 | 2/1993 | Sekine | 123/494 |
| 5,375,465 | 12/1994 | Carlson | 73/155 |
| 5,467,650 | 11/1995 | Cushing | 73/215 |
| 5,572,434 | 11/1996 | Wang et al. | 364/475.02 |

*Primary Examiner*—Ronald L. Biegel
*Assistant Examiner*—Jewel N. Artis
*Attorney, Agent, or Firm*—George W. Dishong

[57] ABSTRACT

The invention relates to a device for measuring discharges in partly or completely filled ducts or open channels, utilizing measuring sensors. The device comprises a central simulation system (CS), comprising a numerical model and a high-performance computer and a local measurement and evaluation system (LME) comprising sensors providing measurements of the fluid level or of the pressure head respectively and providing measurements of the flow velocities and comprising a microprocessor providing data evaluation and a data storage device providing the interface between the two subsystems (CS) and (LME).

15 Claims, 3 Drawing Sheets

METHOD AND DEVICE FOR MEASURING THE DISCHARGE IN PARTLY FILLED OR COMPLETELY FILLED DUCTS AND IN OPEN CHANNELS

BACKGROUND OF THE INVENTION

1. Field of the Invention

The invention relates to a method and apparatus for determining volume flow rate (discharge) of a liquid flowing turbulently through a channel, which may be full or only partially filled.

The invention relates to a method according to the preamble of claim 1 and to a device according to the preamble of claim 24.

The problem underlying the invention is to measure discharges without contact and without deflection of the measured flow. Local velocities are measured but no calibration is used.

This problem is solved by the characterizing features of claim 1 and the characterizing features of the independent claim 24.

Advantageous embodiments of the invention are defined by the subsidiary claims.

2. Description of the Prior Art

Certain methods and apparatus for measuring volume flow rate are described in the following documents.

EP-A-0278671 describes a system in which velocity of flow is measured at a single point within the flow in a drilling rig return line system, together with a measure of the level of the material. These signals are sent via microprocessors 41, 45, via an interface 47 to a central computer 14, which stores various parameters of the conduit and from the measurements and stored parameters calculates flow rate. If the rig is floating, measurements have to be repeated to get instantaneous flow rate values and these are averaged over time (page 15, left hand column).

Patent abstracts of Japan vol. 15, no. 462 (P-1279) 22 Nov. 1991 & JP-A-03197822 discloses a method in which measured values of velocity at a plurality of points in a conduit are fed to a computer programmed with a model of the conduit. The computer takes account of turbulence in the conduit to calculate partial flow velocities at the points for display. Patent Abstracts of Japan vol. 8, no. 72 (P-265) 4 Apr. 1984 & JP-A-58218616 refers to measurement of velocity at one point in a flow and to water level measurement. DE-A-2935015 refers to measuring water level, and storing in a computer a curve of characteristics of a river and water level. Velocity does not seem to be measured.

Other methods and systems of the prior art are described in section 3 below.

SUMMARY OF THE INVENTION

The object of the invention is to provide an improved method and apparatus in which extensive calibration work in the field is avoided, which permits a determination based on a minimum of field measurement, but which at the same time provides improved accuracy.

The objects of the invention are achieved by the method and apparatus as defined in the claims hereof. An embodiment of the invention comprises the measurement system CSLME ("Central Simulation—Local Measurement and Evaluation") in order to determine the discharge of fluids in partly filled or completely filled ducts and in open channels (in the following called discharge of open channel flow).

A more particular object of the invention is the measurement system CSLME ("Central Simulation—Local Measurement and Evaluation") in order to determine the discharge of fluids in partly filled or completely filled ducts and in open channels (in the following called discharge of open channel flow). The CSLME system is an accurate discharge measurement technique utilizing line averaged or punctiform velocity measurements. No calibration by means of grid velocity measurements is used, the CSLME system being based on the numerical simulation of turbulent velocity distributions for arbitrary cross-sections. The CSLME system is shown schematically in FIG. 1 and consists of

Figure 1:
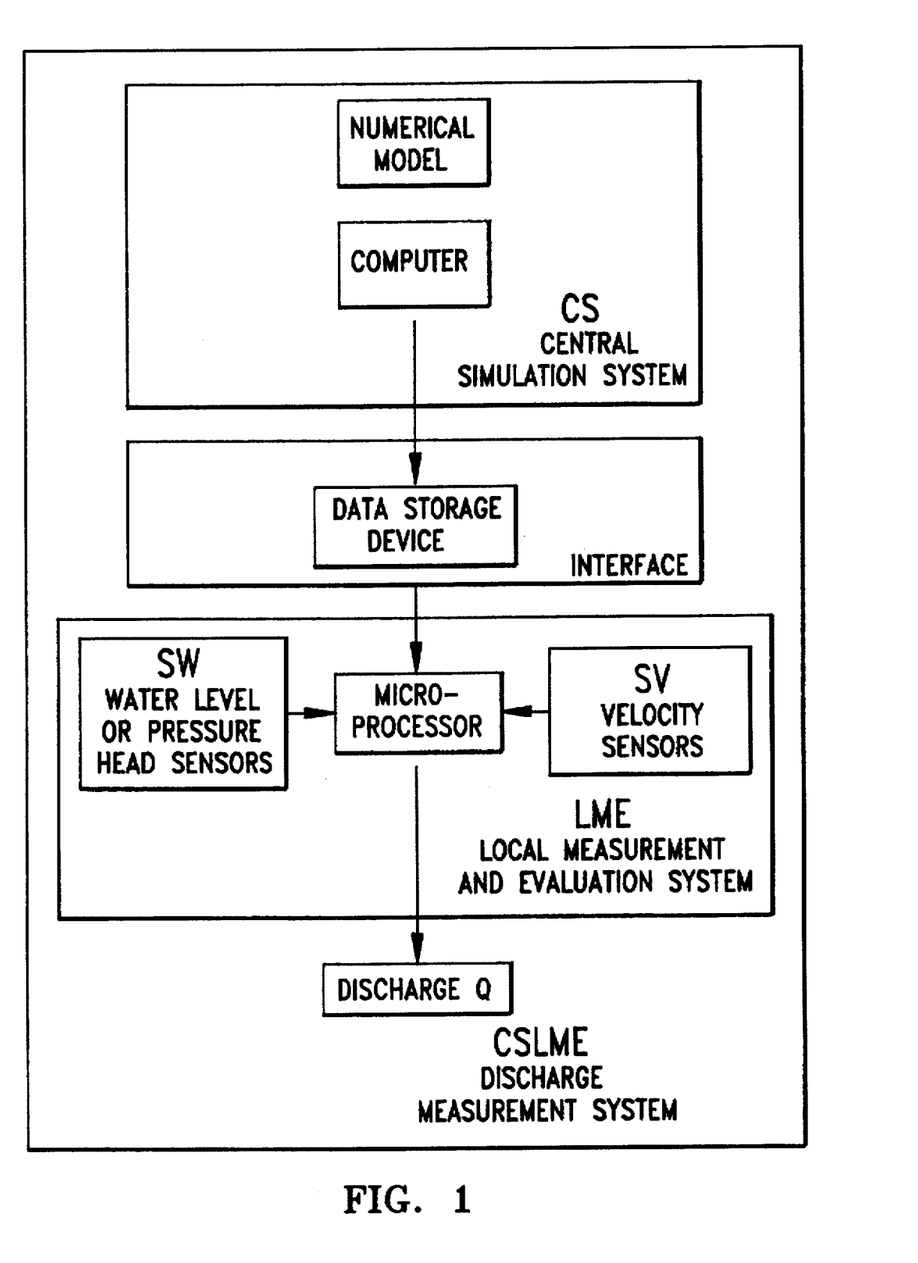
FIG. 1 A schematic description of the discharge measurement system CSLME.

- a central simulation system CS including a numerical model and a high-performance computer,
- local measurement and evaluation systems LME, including devices for measuring the fluid level or the pressure head and velocities, including devices for data evaluation, and
- data storage devices as interface between the CS and LME systems.

Details concerning the technical realization of these components are given in section 5. The term "fluid level" defines the boundary plane between the fluid of which the discharge is to be measured and a superimposed fluid having a much lower density. For convenience in the following, the term fluid level will be replaced by the more illustrative term "water level". The term "water level" will also be used, when the discharge to be measured is not that of water.

2. Survey of Existing Discharge Measurement Techniques and Classification of the Invention Today many different techniques are used for discharge measurements in open channel flows. The following survey divides these techniques roughly according to the physical principles involved and presents the related advantages and disadvantages.

2.1. Mechanical Techniques with Flow Deflection

These techniques produce an intentional stream deflection in amount and/or in direction. The discharge is calculated directly from the physical response to this deflection (changes in water level, pressure, etc.). Examples are Venturi flumes, weirs, pipe bends, Coriolis meters, flow modulation, vortex meters, etc.). Some techniques utilize mechanically mobile devices, which are positioned in the flow. Examples are plates, flap gates or propeller flow meters. The drag or the number of revolutions of these mobile devices depends on the discharge.

The principle advantage of the mechanical devices is that no velocities have to be measured. The measurement value used to calculate the discharge, is an intentionally produced drag. Disadvantageous however is the drag itself: It produces backwater conditions and therefore an upstream rise of water level. This cannot always be tolerated. If the fluid contains solid particles (for instance sewage); undesirable sedimentations in the upstream region will result. Discharge measurement techniques utilizing mechanically mobile devices are generally problematic for fluids with solid transport and should be avoided.

2.2. Techniques Without flow Deflection

The disadvantages of the mechanical techniques are very serious for many applications. Therefore, in many applications techniques are required which do not utilize flow deflection. The common features of these techniques are that they:

- do not produce intentional drags,
- do not use mechanical mobile devices positioned in the flow, and require velocity measurements.

A further division is possible with regard to the position of velocity measurements.

2.2.1 Area Averaged Velocity Measurement

These are integral measurement techniques which directly measure the are averaged flow velocity. In this case electromagnetic flow meters are used which generate an exactly defined magnetic field within the cross-section. The are averaged velocity and therefor also the discharge is calculated directly from the voltage measured.

The advantage of this measurement technique is that the discharge measurement is almost independent of the velocity distribution within the cross-section. Therefore, the demands concerning gradually varied flow and positioning within the longitudinal section of the pipe or the channel are very low. The accuracy obtainable with this discharge measurement technique is high. A minimum conductivity of the fluid is required, which is not the case with petroleum or oil. Disadvantageous are the high technical accuracy of the device and the strong dependency on the profile shape. For each profile type and each profile size the construction and production of special measurement ducts or measurement channels are necessary. With large profiles, especially in open channels, the technical accuracy for the generation of the magnetic field and the field installation of the measurement device rises drastically.

2.2.2 Line Averaged or Punctiform Velocity Measurements

These discharge measurement techniques utilize velocity measurements either as an averaged value along a defined distance within the cross-section ("chordal method") or as a point value at a well defined position within the cross-section (small reference volume). From these line averaged or punctiform velocity measurements the area averaged velocity of the cross-section is deduced. Contrary to the measuring techniques mentioned earlier, these methods generally require a suitable evaluation method and the velocity distribution within the cross-section must be known.

The disadvantage of these techniques is therefore that accurate values of the discharge are only achievable if the velocity distribution within the cross-section is known with sufficient accuracy. If only poor knowledge or even no knowledge of velocity distribution is available, then values can be evaluated from line averaged or punctiform velocity measurements only with very poor accuracy. The advantage is however that the accuracy with a device utilizing line averaged or especially punctiform velocity measurements is much lower compared with techniques using area averaged velocity measurements. In the case of punctiform velocity measurements in particular, the accuracy with the device is nearly independent of the profile size and it is easy to apply the technique to various profile types and profile sizes.

3. Differences Between the CSLM System and Existing Discharge Measurement Techniques Utilizing Wine Averaged or Punctiform Velocity Measurements

3.1. Techniques Restricted to Completely Filled Ducts and Utilizing Measurements of the Velocity Distribution Up to now discharge measurement techniques utilizing line averaged or punctiform velocity measurements are used mainly in solely completely filled pipes. For example, from U.S. Pat. No. 5,185,150 a measurement technique is known which is applicable to solely completely filled pipes only and which utilizes punctiform velocity measurements. The technique according to U.S. Pat. No. 5,185,150 requires that for each calculation of the discharge the overall velocity distribution within the cross-section is measured, which is achieved by means of many repetitions of punctiform velocity measurements at different positions within the cross-section. In contrast however, the new discharge measurement system CSLME is not restricted to solely completely filled pipes, and the determination of the velocity distribution within the cross-section does not require any repetition of velocity measurements at different positions within the cross-section. On the contrary, the CSLME system requires the measurement of the water level and one single local velocity at any position within the cross-section only. These two measurement values are sufficient to calculate the discharge very exactly when using the CSLME system. This will be explained later.

3.2. Techniques Restricted to Completely Filled Ducts and not Utilizing Measurements of the Velocity Distribution Some other discharge measurement techniques are known which are restricted to solely complete filled pipes but do not require velocity measurements at a lot of different positions within the cross-section. Instead of measuring the velocity distribution, these methods assume a velocity distribution which corresponds to sanitary uniform flow. Therefore, by application of these techniques the measurement of the velocity distribution within the cross-section is replaced by the assumption of a well defined state of flow. However, the assumed approximately stationary uniform flow only exists in regions of the duct where changes of the velocity distribution in flow direction are very small. In particular, immediately upstream of the measuring station distortions of the velocity distributions (for instance caused by bends, drops, mouths of branch ducts or branch channels etc.) should be avoided. The disadvantage of these techniques is therefore that larger straight duct or channel sections are essential upstream and downstream of the measuring-stations where no distortions of the velocity distributions are allowed. Even in the case of completely filled stationary uniform flow up to now the knowledge of turbulent velocity distributions is usually available with sufficient accuracy for circular profiles only. In contrast, especially for non circular cross-sections of complex shape, only very poor knowledge is available on turbulent velocity distributions even in the case of completely filled stationary uniform flow. Therefore, up to now the existing discharge measurement techniques utilizing line averaged or punctiform velocity measurements are almost restricted to completely filled circular profiles only if the overall velocity distribution is not determined directly by velocity measurements at different positions within the cross-section.

In the case of completely filled circular ducts discharge measurement techniques are known. The accuracy of these methods is sufficiently high, since for circular profiles it is possible to choose the position of the chordal line utilized by line averaged velocity measurement techniques under the special condition that independently of the discharge, the value of the line averaged velocity approximately equals the area averaged velocity of the circular cross-section of the duct if the flow is approximately stationary and uniform. So far known techniques utilize these kinds of effects and choose special lines or special positions within the cross-section for measuring local velocities. Under these special conditions no further evaluations are necessary. Therefore, techniques known so far not utilizing measurements of the overall velocity distribution within the cross-section are characterized by the following properties:

Line averaged velocity measurements are preferred.

The position of the velocity measurement is defined exactly and known before the measurement takes place.

The data evaluation is minor.

Application of this measuring technique to open channel flows is hardly possible because the position of the chordal line for which the line averaged velocity equals the area averaged velocity of the cross-section is no longer constant but changes with the water level.

3.3. Techniques Applicable to Open Channel Flow and Utilizing Measurements of the Velocity Distribution Discharge measurement techniques utilizing line averaged or punctiform velocity measurements are also known for application to open channel flows. These techniques are based on the relation of the area averaged velocity $v_m$ to the local velocity $v_L$. This relation is determined with the help of one or more calibrations. A measuring technique of this type is known for instance from DE4016529C1. During calibration the velocity distribution is determined by measuring local velocities at many positions. These positions define the measuring grid. This technique is known as "calibration utilizing grid measurement".

Figure 2:
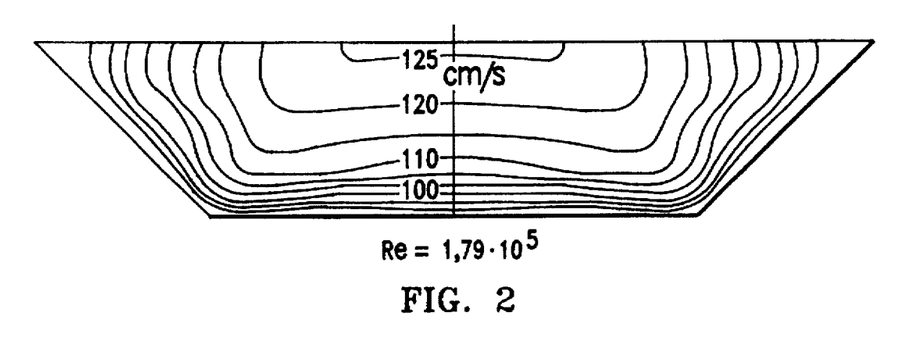
FIG. 2 Velocity distributions in a trapezoidal channel for two different values of discharge (from: Varwick, f.: Zurβformel fur offene kunstliche Gerinne, thesis TH Dresden, Dresden 1944)
Figure 2A:
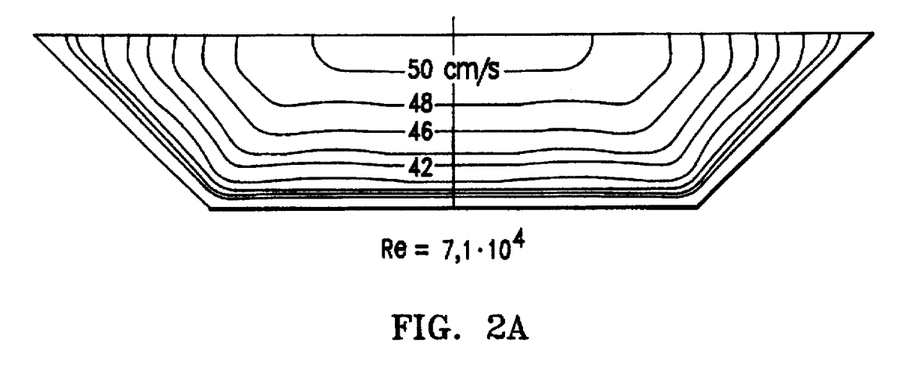

3.4. Techniques Applicable to Open Channel Flow and not Utilizing Measurements of the Velocity Distribution These measuring techniques require knowledge of the relation $v_m/v_L$ as well, but contrary to the techniques explained in section 3.3 the value or $v_m/v_L$ is not determined by means of a calibration. For instance, from U.S. Pat. No. 4.202.211 a technique is known which assumes $v_m=v_L$ overall, that is $v_m/v_L=1.0$. However, as seen from FIG. 2, local velocities $v_L$ and area averaged velocities vm are identical only for special positions within the cross-section even if the presumption of stationary uniform flow is fulfilled. Moreover, in contrast to completely filled circular profiles, these positions are not stationary (see section 3.2), but change especially in dependence on the water level. If, in contrast, the positions for which velocity measurements are performed remain stationary, the relation $v_m/v_L$ will depend on the water level. However, because in U.S. Pat. No. 4,202.211 a constant relation of $v_m/v_L=1.0$ is assumed independently of the water level and no advice concerning variable positions of the local velocity measurements is given, the accuracy of this discharge measurement technique is only poor.

The new discharge measurement technique CSLME does not have this disadvantage. CSLME is a new discharge measurement technique utilizing line averaged or punctiform velocity measurements which is applicable to closed duct flows and open channel flows with the same degree of accuracy. CSLME does not require any measurements of velocity distributions. The decisive characteristic of CSLME is that neither a calibration nor a grid measurement is necessary. The measurement of one single velocity at any position within the cross-section is sufficient to determine the discharge. With CSLME the relation $v_m/v_L$ is not determined by means of a calibration utilizing grid measurements but means of a numerical simulation of the turbulent velocity distribution which depends on the significant flow parameters water depth, profile type, slope, etc.

Like the techniques explained in section 3.2, the new technique CSLME requires approximately uniform flow and achieves comparable accuracies. However whilst high accuracies of the known methods according to 3.2. are restricted to solely completely filled circular pipes, the CSLME technique guarantees the same degree of accuracy for profiles of any shape, and CSLME is applicable both to completely filled duct flow and to open channel flow.

The new discharge measurement technique CSLME is characterized by the following features:

Local velocities are measured either punctiform or along a chordal line.

The position of the velocity measurement need not be known before the measurement takes place and may be variable.

The position of the velocity measurement may be subject to random fluctuations.

In this case the position is an additional measuring value.

The correlation of the local velocity $v_L$ with the area averaged velocity $v_m$ is determined by numerical simulation.

The numerical simulation, the use of a computer and the digital data storage of calculated velocity distributions on a data storage device are additional components of the discharge measuring system CSLME.

It is easy to apply the CSLME technique to open channel flows because no restrictions concerning the positioning of the local velocity measurements exist.

The CSLME system is largely independent of the profile shape.

The utilization of the numerical simulation in the CSLME system not only increases the achievable accuracy of the discharge measurement but enables a considerable reduction of the technical accuracy, and at the same time it reduces the costs of the discharge measurement device.

Hitherto known techniques usually prefer line averaged velocity measurements. In some of these cases data evaluation can be avoided if specific positions of the chordal lines are chosen. Without data evaluation the accuracy achieved with the known line averaged velocity measurement techniques is higher than the accuracy of the known punctiform velocity measurement techniques. However, the line averaged velocity measurement requires the installation of a transmitter and a receiver. In the case of open channel flow these have to be installed on opposite sides of the cross-section because the chordal line should not intersect the water level.

Consequently for wide profiles in particular the chordal line has to be chosen almost parallel to the water level. If the water level is subject to larger fluctuations, another measuring technique problem arises immediately: If the position of the chordal line is made too high, it will dry in the case of low water and as a consequence will be unusable. However, if the position of the chordal line is made too low large differences will result in the case of high water between the measured line averaged velocity and the area averaged velocity within the cross-section. These velocity differences cause larger errors of the discharge determination if they are not corrected by means of an evaluation method. As an alternative, more than one chordal line is used and these lines are installed at different levels. However, this causes an additional increase of the technical accuracy and the measuring device therefore becomes more expensive.

In contrast, the measuring technique CSLME with punctiform velocity measurements provides the possibility of integrating the transmitter and the receiver into a single common housing. The measuring device does not operate by transmission but by backscattering. In open channel flows it is not necessary to install the sensors on the sides, they may be installed at the bottom. The measuring beam is not directed almost parallel to the water level but roughly perpendicular thereto. Therefore, in open channel flows only one sensor is required to monitor punctiform velocities for the whole range of water level variations. The measuring accuracy of a punctiform velocity measurement utilizing a bottom-installed sensor is lower than that of a line averaged measurement. Contrary to hitherto known techniques the CSLME method does not cause a loss of accuracy in the determination of the discharge when using the simplified punctiform measuring device. The reason for the high accuracy of the CSLME technique is the complex data evaluation which allows the calculation of the area averaged cross-sectional velocity from any measured local velocity with high accuracy.

However, the punctiform velocity measurement is not absolutely essential in the CSLME method. As an alternative or in combination, line averaged velocity measurements along predefined chordal lines can be performed. This requires the installation of a transmitter and a receiver on opposite sides of the cross-section. These sensors operate in transmission. The area averaged cross-sectional velocity is calculated from the measured line average velocity by means of the CSLME technique in a manner similar to that on the basis of measured punctiform velocities.

DETAILED DESCRIPTION OF THE PREFERRED EMBODIMENTS

4. Fundamentals of the Invention

As shown in section 3., the accuracy of discharge measurement in open channel flows can be improved if the local velocity measurement is supplemented by a high-performance data evaluation. In this case, it is even possible to reduce the accuracy on the measuring device. The objective of the data evaluation is to determine the relation between a local velocity $v_p$ and the area averaged velocity $v_m$ of the cross-section. $V_p$ may be a punctiform or a line averaged velocity value. By means of the simulation and evaluation systems which are integrated in the CSLME technique (see FIG. 1), this relation can be determined with high accuracy for any water level and for profiles of any shape. The following fundamentals are utilized:

4.1. The Numerical Model

Stationary uniform turbulent velocity distributions in open channel flows are computed numerically with high accuracy for profiles or any shape (see FIG. 2), for defined water levels and for defined longitudinal slopes. This simulation is based on a fine discretisation of the cross-section by means of a numerical mesh, and an application of the finite element method or the finite difference method. Based on this numerical mesh the velocity distribution is calculated assuring continuity and impulse balance in all three dimensions with high accuracy. This simulation requires knowledge of the turbulent viscosity distribution, which is calculated numerically by means of a suitable turbulence model. The numerical simulation requires special attention to the secondary currents.

By means of the numerical model the differential equations related to turbulent open channel flow are solved numerically. This procedure leads to large systems of equations for the variables of the differential equations, which are defined at each node of the numerical mesh. As a solution of these systems of equations, which include several hundreds or even thousands of unknowns, the required velocities are calculated for each node of the numerical mesh. Based on these node values it is possible to calculate velocities at any position within the cross-section. In particular, the relation $v_p/v_m$ between any local velocity and the area averaged velocity can be calculated for an arbitrary location of the position P.

The new discharge measuring technique CSLME thus replaces the calibration based on grid measurements by a simulation based on a numerical mesh.

4.2. The Accuracy of the Discharge Measurement

A characteristic of the numerical model is, that the accuracy of the simulation is increased by means of a finer discretisation of the numerical mesh, which causes an increase of the numerical effort. If the discretisation of the mesh is sufficiently fine even in case of open channel flows the accuracy of the CSLME discharge measurement will depend only on the accuracies achievable for the measuring values of the water level and the local velocities.

4.3. The Measurement of the Water Level

For the measurement of the water level $Y_w$ (see FIG. 3) at least one but usually two sensors SW are used. In case of symmetrical profiles (circle, oval; trapezoid . . . ) the sensors should also be arranged symmetrically. The sensors SW are characterized in that they do not disturb the flow, are very accurate, allow measuring within very short time intervals (several values per second) and provide measurements of the whole range of water levels between the lowest and highest values.

4.4. Measurement of Local Velocities

For measurements of local velocities at least one, but usually two, and in the case of very, high accuracy demands even more sensors SV are used. In the case of symmetrical profiles these sensors should also be arranged symmetrically The sensors SV are characterized in that they do not disturb the flow, measure the velocity $v_p$ either within a very small control volume (punctiform measurement at point P) or as the mean along a defined chordal line (line averaged measurement along the chordal line P), not only measure the local velocity $v_p$ at point P, but additionally measure the cross-sectional coordinates $x_p$, $y_p$ of the measuring point P (see FIG. 3) each time, if the punctiform velocity measurement technique is applied and the special method according to section 4.5, is not used, can vary the location of the punctiform measurements for each measuring value, when using the punctiform velocity measurement technique, are very accurate, allow measurements within very short time intervals (several values per second)

and provide velocity measurements within the whole range of water levels between the lowest and highest values.

4.5. Special Technique for Punctiform Velocity Measurements Utilizing Measurement of the Maximum Velocity If this special technique is applied no measurements of cross-sectional coordinates $x_p$, $y_p$ of the measuring position P are required. However, the other requirements according to section 4.4. are also valid for this special technique. In addition the application of this special technique requires that the installation of the velocity sensors allows velocity measurements for the complete range of water level variations and it should be possible to measure velocities within the region of the cross-section for which the deviation between the local velocity and the maximum profile velocity is very small. These regions are determined by means of numerical simulation before the sensors are installed.

The velocity sensors provide a large number of local velocity measurements. The maximum velocity $v_{max}$ within the cross-section results from the evaluation of these signals. By means of computational fluid dynamics, included in the CSLME technique, the area averaged cross-sectional velocity $v_m$ is calculated on the basis of this maximum velocity $v_{max}$. It is therefore a characteristic of this special technique to replace the information on the local coordinates $x_p$, $y_p$ of the measuring position by the equivalent property of the maximum velocity $v_{max}$.

5. Technical Realization of the Discharge Measuring System CSLME

The discharge measuring system CSLME (see FIG. 1) consists of a central simulation system CS and local measuring and evaluation systems LME. The interface between both subsystems is established by suitable data storage devices, which are written into by the CS subsystem and are read by the LME subsystem. The central simulation system CS is present only once and can be installed locally separated from the local measuring and evaluation systems LME. However, many LME subsystems exist which have to be installed at each measuring station. In the following, each component of the system will be explained.

5.1 The Central Simulation System CS

The CS is the kernel of the discharge measuring system. It consists of an extremely sophisticated numerical model and a high-performance computer. Stationary uniform velocity distributions are simulated which are characterized by the following four features:

1. Profile Type

The profile type characterizes the kind of geometrical shape. Possible profile types are for instance a circle, rectangle, trapezoid, oval or mouth. In addition it is possible to define a profile by means of its polygonal circumference only. Natural rivers and channels are an interesting application of this type. In the case of hydraulic rough profiles it might be necessary to define different profile types for the different roughness values.

2. Profile Size

For each profile type the geometrical dimensions are varied. For instance in the case of a circular profile the diameter or in the case of a rectangular profile the bottom width are varied.

3. Water Level $Y_w$.

The velocity distributions are calculated for each profile type and different profile sizes for various values of water levels $Y_w$.

4. Channel Slope in Axial Direction I

The slope of the duct or the channel in axial flow direction is decisive for the acceleration of the fluid and therefore for the magnitude of the velocity values within the cross-section. As a result the slope has to be varied too.

For each of the very large number of possible combinations of these four above mentioned features the velocity distributions are simulated once by means of the numerical flow model and the turbulence model. Thereafter, the velocity distributions are known for the entire area of the cross-section and they are stored together with the discharge value which is deduced from these data, and the four features in a suitable data storage device. It is possible to choose different data storage devices for each profile type or even for each profile type and profile size. In this case the contents of the data storage device will depend on the profile. Suitable data storage devices are for instance magnetic tapes, floppy discs or compact discs.

The utilization of the sophisticated simulation system which requires a very powerful computer, provides the following advantages:

The measuring costs for the local measuring and evaluation systems LME can be drastically reduced, and contrary to the data storage devices the LME are almost independent on the profile.

5.2. The Local Measurement of the LME System

The local measuring and evaluation system LME (see FIG. 1) consists of sensors SV providing local velocity measurements sensors SW providing measurements of the water level (or the pressure head in the case of closed duct flow), and a microprocessor which transforms the measured signals of the sensors SV and SW to the required discharge value Q, utilizing the velocity distribution data stored in the data storage device.

Figure 3:
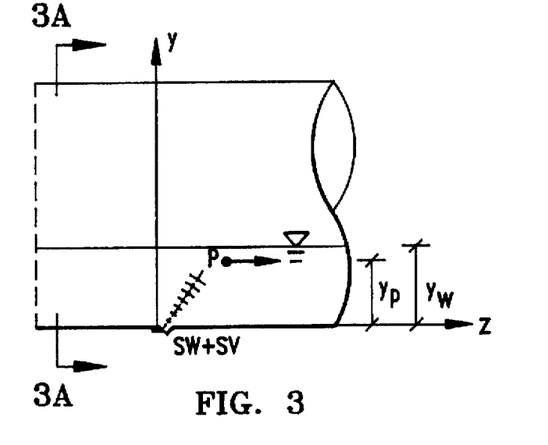
FIG. 3 Arrangement of sensors in circular profile, as an example, in longitudinal and in cross section.
Figure 3A:
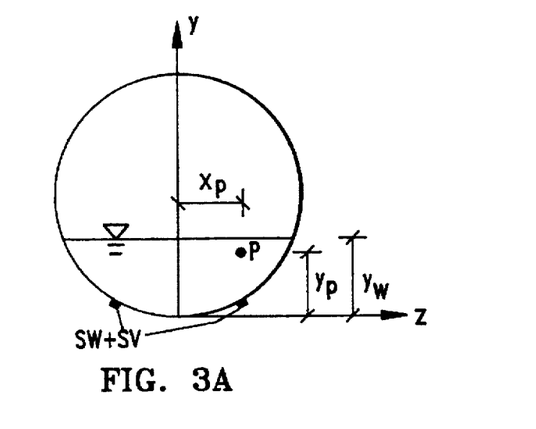

FIG. 3 shows for the example of a circular profile a possible sensor installation utilizing punctiform velocity measurements and satisfying the requirements of section 4. One sensor SV and one sensor SW are installed in a single common housing. This combined sensor can be designed to screw on and in this case a suitable drilling is the only in situ requirement. Two of these combined sensors are installed symmetrically at the bottom of the profile. On the one hand, the sensors should be installed near the bottom of the profile in order to measure discharges even with low water. On the other hand, they should be installed sufficiently high, in order to avoid clogging.

5.2.1. Sensors SV Providing Local Velocity Measurements

It is favorable to measure local velocities by means of ultrasonic sensors. In the case of punctiform velocity measurements impuls-Doppler velocity meters are used. This method requires minute sound scattering particles to be carried with the fluid. This requirement is usually fulfilled. These sensors SV utilize backscattering and therefore both the transmitter and the receiver can be installed within the same housing. The transmitter emits ultrasonic waves which strike the scattering particles and are scattered back to the receiver sensor. The measurable difference between the transmitted and the received frequency (Doppler frequency) is a measure of the local velocity $v_p$. If the technique according to section 4.4. is applied, a measurement of the location P of the velocity measurement is additionally required.

Utilizing the impuls-Doppler technique the location P is determined by measuring the travel time of the pulse from the sensor to the scattering particle and back. This travel time is a measure of the distance between the scattering particle and the sensor. The determination of this distance suffices for the calculation of the location of the measuring point $P(x_p, y_p)$ (see FIG. 3) because the direction of the ultrasonic beam is known.

The ultrasonic beams emitted by the transmitter in the direction of the water level usually strike a great number of particles and are partly scattered back to the receiver. Therefore, a large number of ultrasonic signals are received at the receiver sensor. However, because these signals are received with time delays each signal can be correlated with a local velocity $v_p$ and additionally with a distance between the measuring point P and the sensor. Each ultrasonic signal thus provides the cross-sectional coordinates ($x_p$, $y_p$) of the different points P. Consequently only one ultrasonic beam is required to measure and differentiate local velocities at many positions P along the beam.

Nevertheless, the impuls-Doppler velocity meter is in principle a device utilizing punctiform velocity measurements, because the evaluation of one single ultrasonic beam provides numerous discrete triplets of measuring values $x_p$, $y_p$, $v_p$ along a line. Contrary in the case of line averaging velocity measurement techniques, the evaluation of one ultrasonic beam provides a single measuring value only, which represents the average velocity along the chordal line. Since the overall evaluation of the pulse is as fast as the velocity of sound, it is possible to repeat the impuls-Doppler measurement very often within very short time intervals. As a result of this procedure a measured velocity profile along the path of the ultrasonic beam between the sensor SV and the water level is obtained with high local resolution.

However, hitherto employed punctiform and line averaged velocity measuring techniques are only capable of using a low proportion of the large number of measuring values which can be provided by the impuls-Doppler velocity meter within very short time intervals. This shortcoming of known techniques is due to the fact that sufficiently accurate correlations between a local velocity $v_p$ at any arbitrary position within the cross-section and the required area averaged velocity $V_m$ were not available in open channel flows. In contrast, the CSLME technique is capable of taking full advantage of the impuls-Doppler velocity meter because the simulated velocity distributions provide the possibility of using all of the different measuring values completely. As a result the application of CSLME provides a considerable increase of accuracy for the determination of the discharge without requiring an increase in the measuring accuracy.

Alternatively to ultrasonic measurement techniques, known Laser Doppler Anemometer (LDA) utilizing backscattering can be applied. By means of this optical device the requirements or section 4. can also be fulfilled. Special advantages of this technique are very high accuracies, a high local resolution and measurements within very short time intervals. The application of the LDA technique requires admixtures of light scattering particles within the fluid and an optical transparency of the fluid. Disadvantageous up to now are the high costs for installation and running of this measuring device.

Line averaged velocity measurement techniques measure the average velocity along a defined chordal line. In this case ultrasonic sensors are preferably used as well. However, these devices utilize travel time methods and an installation of a transceiver and a receiver on opposite sides of the chordal line is required.

5.2.2. Sensors SW Providing Measurements of the Water Level or the Pressure Head Respectively Suitable sensors SW, providing measurements of the water level or the pressure head in the case of open channel flow or in the case of closed duct flow are known pressure cells which utilize piezometric, capacitive or inductive methods. Pressure cells are technically well developed sensors which have been proven in a variety of practical applications as precise, high-speed and robust measuring devices which do not disturb the flow.

In the case of open channels or solely partly filled ducts the measurement of the water level can alternatively be achieved by means of ultrasonic sensors. In principle, the sensor can be installed either above the maximum possible water level or at the bottom of the profile.

Figure 4:
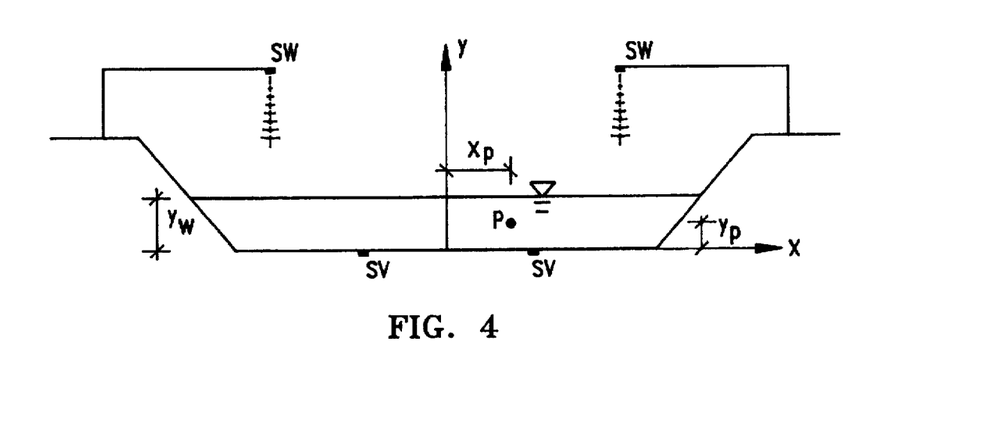
FIG. 4 Alternative arrangements of sensors in open channels.

FIG. 4 shows as an example the arrangement of sensors in the case of a trapezoidal channel. In this case the water level is measured by means of ultrasonic sensors SW. The sensors are mounted on a measuring bridge and remain dry. The water level is measured from the top. Therefore, these are contactless sensors which cannot be damaged by the fluid flow. The local velocities are measured by separate velocity sensors SV installed at the bottom of the channel in a manner similar to FIG. 3. This arrangement of the ultrasonic sensors SW is particularly advantageous, when no independent measuring bridge needs to be built and the sensors SW can be mounted on an existing construction.

The measurement of the water level can be simplified if the local velocities $v_p$ are measured by means of an impuls-Doppler velocity meter as recommended in section 5.2.1. If the velocity sensors SV are installed on the bottom of the profile and its ultrasonic beams are directed nearly perpendicular to the water level, an installation of an independent water level measuring sensor SW can be avoided completely. The water level is then determined by measuring the local velocities by means of the impuls-Doppler velocity meter. This is an additional advantage of CSLME, which enables the determination of the discharge by means of a high-performance evaluation of the measuring values provided by the impuls-Doppler technique (see section 5.3.).

As explained in section 5.2.1, the velocity measurement of the impuls-Doppler velocity meter is based on backscattering of ultrasonic waves by sound scattering particles which must be carried by the flow. However, this kind of backscattering is also caused to a high degree by the water surface because of the large difference in fluid density at the interface of the two fluid phases. The water surface thus causes a strong backscattering of the ultrasonic waves. The distance between the water surface and the velocity sensor SV and consequently the position of the water surface itself is derived from the measured travel time of the ultrasonic waves needed to cover the distance from the sensor SV to the water surface and back.

5.3. The Local Data Evaluation of the LME System

By means of the local data evaluation of the LME system the discharge Q is evaluated from the measuring signals provided by the sensors SV and SW (see section 5.2.). This is achieved by utilizing the data storage devices, provided by the CS system, and a microprocessor (see FIG. 1). The data evaluation depends on the kind of local velocity measurement used according to one of the following methods or a combination thereof:

5.3.1. Punctiform Velocity Measurement Including Measurement of the Position $x_p$, $y_p$ 1. Each sensor SV is correlated at least with one sensor SW in such manner that for each punctiform local velocity measurement at the measuring position P the four measuring values $Y_w$, $x_p$, $y_p$ and $v_p$ are provided for further data evaluation.

2. The discharge measuring station and therefore also the LME are defined by a certain profile type and profile size. Therefore, together with the measured water level $Y_w$ (or the pressure head in the case of completely filled closed duct flow), three of the four parameters of the velocity distribution explained in section 5.1are known. The fourth parameter is the slope I in the flow direction. However, it is impossible to measure this slope with acceptably low accuracy and sufficient accuracy. Therefore, the value of I is replaced by the local velocity $v_p$ at the measuring point P, which is much simpler to measure and which can be obtained with much higher accuracy. By means of the microprocessor one of the velocity distributions stored in the data storage device is selected. This selected velocity distribution meets the three first mentioned parameters and its velocity value at the measuring position $x_p$, $y_p$ is equal to the measured value $v_p$. Consequently the discharge Q, which is correlated to this selected velocity distribution and which is also stored in the data storage device, can be assigned to the measurement of the local velocity at the measuring position P and is called $Q_p$. This briefly described search algorithm can be refined with a suitable interpolation algorithm. The determination of $Q_p$ requires low computer performance only and can be obtained within a very short time.

3. By means of the data storage device and the microprocessor each punctiform local velocity measurement at the measuring position P is related to a discharge $Q_p$, as shown above. This measuring value transformation is repeated for each measuring point P and each velocity sensor. The desired discharge value Q is finally derived from the average of the individual discharges $Q_p$, which can be weighted suitably. Special attention has to be paid to the fact that only one single local velocity at any measuring position P is required for the determination of the discharge Q. The repetition of the measurement is not a prerequisite of the CSLME technique. However, repetition is an easy method of increasing considerably the overall accuracy of the measurement. Since the accuracy of the discharge measurement can be increased by utilizing a large number of measuring points, it is advisable to use high-speed sensors SV for the CSLME technique. This recommendation is fulfilled with acoustic and optical sensors.

5.3.2. Punctiform Velocity Measurement Including Measurement of the Maximum Velocity According to the Special Technique Outlined in Section 4.5.

1. The measuring signals provided by the sensors SW are averaged and give the averaged measured water level $Y_w$ (or the pressure head in case of completely filled closed duct flow). The special technique utilized for the determination of the discharge Q is based on this value $Y_w$ and the measured maximum velocity Vmax.

2. Comparable to the procedure outlined in section 5.3.1, one of the velocity distributions stored in the data storage device is selected by means of the microprocessor. The profile type and the profile size of the selected velocity distribution correspond to the actual discharge measuring station and its water level $Y_w$ (or the pressure head in the case of completely filled closed duct flow) and the maximum velocity $v_{max}$ best match the measured values. The discharge Q, which relates to the selected velocity distribution and which is also stored in the data storage device, represents the desired discharge value Q. Therefore, contrary to the technique outlined in section 5.3.1., the repeated measurement of the position of the velocity measurement is replaced by the characteristic feature of the velocity maximum, which provides an equivalent method for identifying the relevant velocity distribution supplied by numerical simulation.

5.3.3. Line Averaged Velocity Measurement

1. If local velocity measurements are performed which provide average values along one or more chordal lines then in contrast to the technique outlined in section 5.3.1. the location of the measurement is defined by the positions of the sensors. Consequently these positions are known and it is not necessary to measure them. Each sensor SV is correlated at least with one sensor SW in such a manner that for each line averaged local velocity measurement along a chordal line P both values $Y_w$ and $v_p$ are obtained for further data evaluation.

2. Comparable to the procedure outlined in section 5.3.1. and 5.3.2., by means of the microprocessor one of the velocity distributions stored in the data storage device is selected. The profile type and the profile size of the selected velocity distribution correspond to the actual discharge measuring station and its water level (or its pressure head in case of completely filled closed duct flow) and its line averaged velocity along the same chordal line P best match the measured values Consequently, the discharge Q correlated to this selected velocity distribution and also stored in the data storage device can be assigned to the local velocity measurement along the chordal line P and is called Qp.

3. By means of the data storage device and the microprocessor each line averaged local velocity measurement along the chordal line P is correlated with a discharge $Q_p$, as shown above. This measuring value transformation is repeated for every local measurement and every chordal line. Comparable to the procedure outlined in section 5.3.1. the desired discharge value Q is derived from the average of the individual discharges Qp which can be weighted suitably concerning the repetition of the measurements reference is made to section 5.3.1.

6. The Essential Characteristics and the Preferred Applications of the Discharge Measurement Technique CSLME Finally, the essential characteristics of the invention will be summarized and the preferred applications set forth. The discharge measurement technique CSLME uses methods of computational fluid dynamics for simulating fluid flows and employs devices for measuring water levels (or pressure heads) and local velocities. These methods and devices if considered separately and for the listed applications only, are already known. However, the CSLME combines them in the desired manner in order to determine the discharge in open channel flows. This special combination and its application to open channel flows defines a new discharge measuring technique. The decisive features of CSLME are the following:

- Subdivision into three parts, which consist of the central simulation system (CS), the local measurement and evaluation system (LME) and data storage devices.
- Discharge measurement technique avoiding drags, flow deflections and any mechanically movable installations exposed to flow.
- Local velocity measurements provided by high-speed sensors, which can be mounted on the wall of the duct or the channel.
- Correlation between local velocities at arbitrary positions within the cross-section and the area averaged velocity by means of computational fluid dynamics.
- Correlation between the maximum velocity within the cross-section and the area averaged velocity by means of computational fluid dynamics.
- Reduction of (permanent) measuring accuracy in the LME which is achieved by an (unique) increase of simulation accuracy in the CS.
- In particular the application of the impuls-Doppler velocity meter in CSLME for local velocity measurements provides a considerable increase of accuracy compared to existing techniques, although the measurement accuracy is substantially reduced.

The LME-system is largely independent of the profile shape and consequently standardization of a high degree is achievable.

The discharge measurement technique CSLME can be employed in many applications in open channel flows. In comparison with known techniques, special advantages result from the CSLME features explained if any of the following conditions is met:

any profiles of noncircular shape and open channels large profiles (for instance in natural flows and sewers)

temporary or mobile measuring device (for instance for control purposes)

poorly accessible or remote measuring stations (for instance existing sewers, pipelines)

fluids of low electrical conductivity (for instance petrol, oil) fluids exhibiting solids discharge (for instance sewage, brooks and rivers at high water).

I claim:

1. In an improved method of determining a volume flow rate of a liquid flowing turbulently in a channel having a known cross-sectional profile, which includes measuring a liquid level and measuring an axial flow velocity in the channel and determining the volume flow rate of the liquid in the channel from the liquid level measurement and the axial flow velocity measurement, said improvement comprising:

a) simulating a set of turbulent flow velocity distributions for said channel based on a numerical mesh of said known cross-sectional profile for at least one different liquid levels being chosen in such a way that all possible liquid level variations which occur during real flow conditions in said known profile is uniformly covered by said chosen liquid levels; and also simulating, using a numerical model, turbulence driven secondary currents within said known cross-sectional profile;

b) measuring at least one axial flow velocity within said known cross-sectional profile, said at least one axial flow velocity selected from the group of axial flow velocities consisting of an axial velocity within a very small flow volume located at a measured spatial position within said profile, a line-averaged axial flow velocity along a known line between two points within said profile, and a maximum axial velocity occurring anywhere within said profile, to provide a measured axial flow velocity, c) measuring said liquid level in said channel; and d) determining said volume flow rate in said channel on the basis of said measured axial flow velocity and a selected one of said simulated velocity distributions, which is uniquely selected from said set of simulated velocity distributions on the basis of said measured liquid level.

2. Method as in claim 1, in which said volume flow rate is determined using a combination of said measured axial flow velocities from said group of axial flow velocities.

3. Method as in claim 1, further comprising:

repeating said determining said volume flow rate at least one additional time; and calculating said volume flow rate as a weighted average of all said determined volume flow rates thereby said determined weighted average improving accuracy of said volume flow rate.

4. Device for determining a volume flow rate of a liquid flowing turbulently in a channel having a known cross-sectional profile, comprising:

a central simulation system in which a numerical model is programmed and which simulates a set of turbulent flow velocity distributions for said channel on the basis of data as to the cross-sectional size and shape of said known profile and the hydraulic configurations of said liquid and said channel and on the basis of a numerical mesh of said cross-sectional profile, said programmed central simulation system simulating turbulence driven secondary currents within said known cross-sectional profile;

a data storage device storing said set of simulated turbulent flow velocity distributions generated by said central simulation system;

a local measurement and evaluation system, comprising measuring sensor means having means for measuring liquid level and means for measuring axial flow velocity in the channel, said measured axial flow velocity supplied by said measuring sensor means and a selected one of said velocity distributions stored in said data storage device, said selected one of said velocity distributions stored in said data storage device providing an interface between said central simulation system and said local measurement and evaluation system; and a microprocessor transforming signals from said axial flow velocity sensor and said liquid level sensor into a volume flow rate value, ultilizing data provide by said central simulation system.

5. Device as in claim 4, further comprising means for assigning said measured axial flow velocity to an area-averaged axial velocity in said known channel.

6. Device as in claim 4, wherein the central simulation system is installed separately from the local measuring and evaluation system, which is installed at the measuring stations.

7. Device as in claim 4, wherein said measuring sensor means of the local measurement and evaluation system, comprises;

at least one axial flow velocity sensor providing at least one axial flow velocity measurement, at least one liquid level sensor providing at least one measurement of the liquid level.

8. Device as in claim 7, wherein as part of said local measurement and evaluation system said at least one liquid level sensor and said at least one axial flow velocity sensor are each installed within one common housing.

9. Device as in claim 7, wherein at least one of said at least one liquid level sensor and at least one of said at least one axial flow velocity sensor are installed near to a bottom of said channel in order to measure volume flow rates even at low liquid levels, but said near bottom installation of said sensors are installed in a sufficiently high position in order to avoid clogging.

10. Device as in claim 9, wherein said at least one axial flow velocity sensors are ultrasonic sensors providing measurements of the axial flow velocities and utilizing the pulsed Doppler method based on the backscattering principle in the case of punctiform measurements and comprising a combined transmitter and receiver sensor within a common housing, said combined transmitter and receiver sensor providing the measuring values required for the determination of measuring point position which is calculated from a known direction of an ultrasonic beam of said ultrasonic sensors.

11. Device as in claim 9, wherein said at least one axial flow velocity sensors are ultrasonic sensors providing measurements of the axial flow velocities and utilizing the travel time method based on transmission in the case of line averaged measurements.

12. Device as in claim 9, wherein said at least one liquid level sensor providing measurements of the liquid level when said channel is an open channel and of pressure head when said channel is a closed channel is selected from the group consisting of sensor types using piezometric, capacitive and inductive methods.

13. Device as in claim 9, wherein said channel is open and said at least one liquid level sensors providing liquid level measurements are ultrasonic sensors installed above the maximum possible liquid level and for measuring pressure head at the bottom of the profile.

14. Device as in claim 13, wherein said at least one liquid level sensor is installed dry on a measuring bridge and measuring the liquid level from above and said at least one axial flow velocity sensors providing axial flow velocity measurements is installed at the bottom of the channel.

15. Device as in claim 4, wherein said measuring sensor combines the measurement of the axial flow velocity and the measurement of the liquid level within one common sensor said one common sensor being an ultrasonic sensor installed at the bottom of the channel in a manner providing measurements of the axial flow velocities and utilizing the pulsed Doppler method based on backscattering.

* * * * *